United States Patent [19]

Jenkner

[11] Patent Number: 4,694,871
[45] Date of Patent: Sep. 22, 1987

[54] PROCESS FOR THE MANUFACTURE OF PANEL-TYPE WORKPIECES WITH ASSEMBLY BORES, MORE PARTICULARLY, MADE OF WOOD OR WOOD-LIKE MATERIAL AND APPARATUS FOR PERFORMING THE PROCESS

[76] Inventor: Erwin Jenkner, Lindenstrasse 13, Gechingen, Fed. Rep. of Germany, D-7261

[21] Appl. No.: 806,274

[22] Filed: Dec. 6, 1985

[30] Foreign Application Priority Data

Dec. 8, 1984 [DE] Fed. Rep. of Germany ....... 3444929
Jun. 21, 1985 [DE] Fed. Rep. of Germany ....... 3522278

[51] Int. Cl.$^4$ ............................................. B27M 1/08
[52] U.S. Cl. .................................. 144/35 R; 144/3 R; 144/365; 144/367; 144/356; 144/379; 408/12; 408/26; 408/29; 408/37; 408/41
[58] Field of Search .................... 144/1 R, 3 R, 35 R, 144/365, 367, 356, 379; 408/3, 8, 12, 26, 29, 30, 37, 41; 29/33 R, 563, 564

[56] References Cited

U.S. PATENT DOCUMENTS

| | | | |
|---|---|---|---|
| 3,483,904 | 12/1969 | Jacumin | 144/3 R |
| 3,832,083 | 8/1974 | Dockery et al. | 144/35 R |
| 3,833,033 | 9/1974 | Hurn | 144/3 R |
| 4,243,081 | 1/1981 | Pritelli | 144/35 R |

Primary Examiner—W. D. Bray
Attorney, Agent, or Firm—Dick and Harris

[57] ABSTRACT

A process is described, with the aid of which panel-type workpieces to be manufactured from a panel blank may also be provided with flat face and/or end face bores in the course of their manufacture. For this purpose, the panel blank is displaced transversely to the cutting plane into a stop position, the flat face bores pertaining to one of the workpieces to be manufactured are subsequently made in the one flat side of the panel blank. To make the further flat face bores for the workpiece, the panel blank is then transported further in a clocked manner through predetermined paths in the same direction and bored after each advance. Upon completion of all of the flat face bores, the panel blank is displaced in a clocked manner in the opposite direction into predetermined positions, fixed after each advance, and lastly severed.

For the end face boring, the panel blank is displaced in the direction of advance through a path corresponding to a side length of a workpiece and subsequently clamped and severed. The resulting workpiece is then displaced in the direction of advance through a predetermined path, clamped and bored at the end face located opposite to the bored end face. The remaining part of the panel blank is displaced in the direction of advance into a stop position, likewise bored at the end face, and lastly displaced again in the direction of advance through a path corresponding to a side length of a workpiece, clamped and severed, whereupon the same procedural steps are repeated.

12 Claims, 11 Drawing Figures

PROCESS FOR THE MANUFACTURE OF PANEL-TYPE WORKPIECES WITH ASSEMBLY BORES, MORE PARTICULARLY, MADE OF WOOD OR WOOD-LIKE MATERIAL AND APPARATUS FOR PERFORMING THE PROCESS

This invention relates to a process for the manufacture of panel-type workpieces with assembly bores, more particularly, made of wood or wood-like material, and to an apparatus for performing the process.

In the production of panel-type workpieces, for example, for the manufacture of furniture, the completion of such workpieces with assembly bores such as flat face and end face bores is carried out after the workpieces have been made to size. The workpieces are first manufactured from a panel blank on a panel splitting machine and then put in a further operation on a boring machine on which the flat face bores are made.

Bores in the end face edge or edges of workpeices are, on the other hand, made by another boring machine.

The object underlying the invention is to provide a process which enables panel-type workpieces to be cut and provided with assembly bores without various machines having to be made available for the corresponding work operations. It should enable manufacture of workpieces of different size and different bore distribution in single piece production, rationally, without time loss and without conversion problems.

Accordingly, with the aid of the inventive process, assembly bores, and, more particularly, either flat face bores or end face bores or both categories of bores may be made on workpieces without the same having to be moved to various machining locations. The manufacturing time of such workpieces may, therefore, be reduced to a minimum.

To make bores in the flat faces of workpieces, a panel blank from which a number of workpieces are to be made, may first have the flat face bores for all of these workpieces machined in it. Bores are distributed accordingly in predetermined areas of the panel blank and the panel blank is then split up into the single workpieces by severing cuts.

It is equally possible, upon completion of the flat face bores for one workpiece, respectively, for the same to be severed from the panel blank.

In the event that workpieces are also to be bored at the same time at the end face, the single panel-shaped workpieces may, upon completion of the splitting up of the panel blank, be bored at one or at opposite end faces.

The process furthermore enables workpieces to be provided with assembly bores at the end faces only, and, more particularly independently of an immediately preceding splitting up of a panel blank. It is also possible in the case of workpieces to be bored at opposite end faces, to machine the corresponding bores in the pertinent end faces successively, with one machining position being maintained. This operation therefore produces one workpiece bored at two end faces and one workpiece bored at one end face.

Suitable for performance of the inventive process is an apparatus solely for provision of flat face bores or only for provision of end face bores in workpieces.

The apparatus according may also exhibit a combination of the features so that workpieces may be bored on both the flat and end faces in one cycle.

Finally, the apparatus generally offers the advantage that it is also possible to first make, in particular, strip-shaped panel blanks on it from a raw board before such panel blanks are machined in accordance with the inventive process.

Further features and details of an apparatus shown in the drawings for performing the process are explained in the following description. The drawings show solely schematically.

Figure 1:
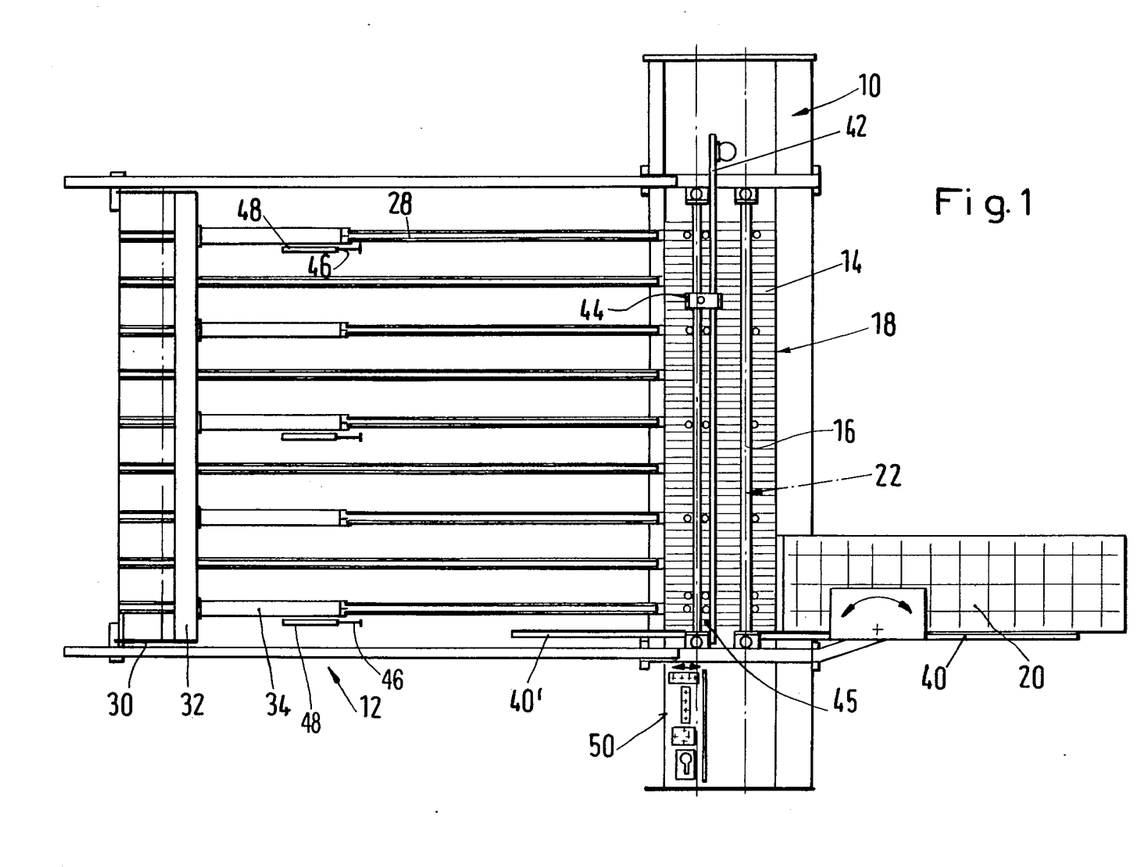
FIG. 1 a top view of the apparatus comprising a panel splitting machine interlinked with a workpiece advancing device with a progrmmable workpiece slide.

The apparatus shown in FIG. 1 for performing the process comprises a panel splitting machine 10 of a known design and a workpiece advancing device 12 of a known design which are interlinked with each other.

The panel splitting machine comprises a workpiece support table 18 with a workpiece clamping device arranged on the same, for example, in the form of a pneumatically vertically movable press beam 16.

Associated with the machine table 18 comprising the horizontal workpiece support surface 14 in a known manner is a workpiece feed table 20 which is arranged, for example, in the area of the left end of the workpiece support table.

Extending along the workpiece support table 18 in the same, beneath the press beam 16, is a saw slit 22 defining the cutting plane of the panel splitting machine.

Figure 2:
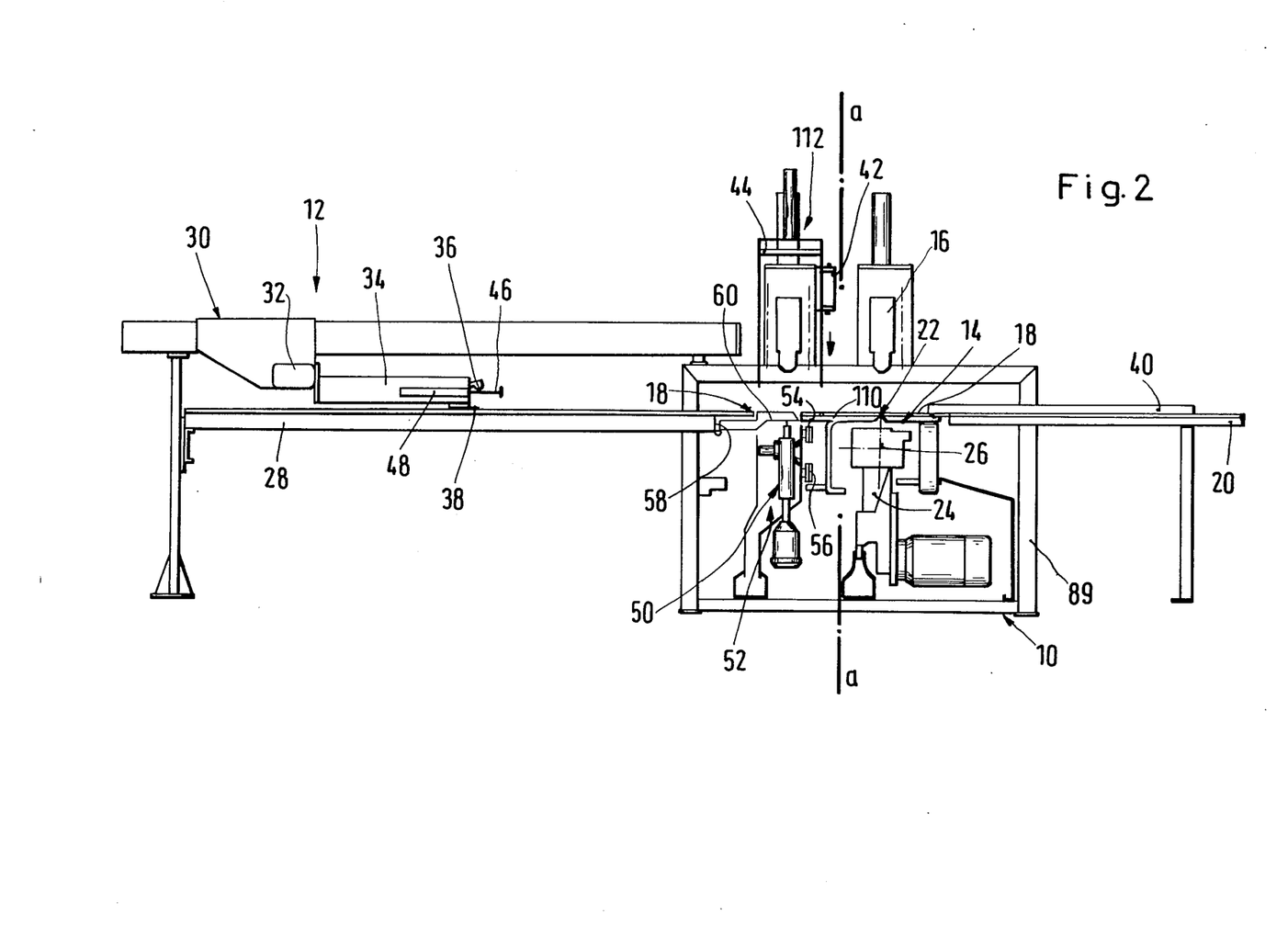
FIG. 2 a sideview of the apparatus.

Reference numeral 24 designates in its entirety a saw carriage which is displaceable on the underside of the workpiece support table along a guide parallel to the saw slit 22. This saw carriage 24 is preferably provided with two circular saw blades 26 which are rotatably arranged on parallel shafts and adjustable in laterally spaced relationship to each other. In FIG. 2, only one of these circular saw blades is illustrated. One of these two circular saw blades is for the purpose of scoring or also severing.

The workpiece advancing device 12 is connected to the rear longitudinal side of the workpiece support table 18 and comprises a plurality of parallel workpiece support strips 28 which are arranged in a common horizontal plane and extend perpendicularly to the saw slit 22. Reference numeral 30 designates in its entirety a programmable workpiece slide comprising a cross bar 32 which is located at a distance above the support strips 28 and on which a plurality of preferably pneumatically actuatable workpiece chucks 34 is arranged in laterally spaced relationship to one another, with their gripper legs 36 and 38 (FIG. 2) extending in the direction of the workpiece support table 18.

The workpiece feed table 20 is provided in a known manner with a side stop 40 which extends perpendicularly to the saw slit 22 and has a continuation 40' behind the saw slit 22. Associated with this side stop on the panel splitting machine 10 above its workpiece support surface 14 is a transverse stop 44 which is displaceable along a guide cross bar 42 and with the aid of which workpieces placed on the workpiece feed table 20 may be placed against the side stop 40, 40'. In the non-operating position of the transverse stop 44, the same is located in the area of the right end of the workpiece support table 18 in a raised initial position.

Reference numeral 46 designates a further stop which is horizontally extendable perpendicularly to the saw slit 22 from a stop device 48 arranged on the side of the side stop 40, 40' on the cross bar 32 of the workpiece slide 30. Such a stop device 48 is preferably likewise located on the opposite side of the cross bar 32. Further similar stops may also be arranged in the area between these two stop devices 48.

The two stop devices 48 serve to align panel blanks which are to be split up or raw boards which are to be split up into panel blanks, before the first severing cut, relatively to the saw slit 22 for execution of a first trimming cut.

The apparatus is provided with a workpiece boring and assembling device, designated in its entirety by reference numeral 50, with the aid of which both flat face bores and bores in end face edges may be made in panel-type workpieces to be manufactured on the apparatus.

In a preferred embodiment of the apparatus, this device 50 is arranged between the workpiece support table 18 and the workpiece advancing device 12, beneath the workpiece support surface 14. It could, however, also be arranged above the same. Alternatively, this device 50 could also be arranged on the opposite side of the workpiece support table 18 at the top or bottom.

This boring and assembling device 50 comprises a carriage-type carrier 52 which is guided in a displaceable and lockable manner on superimposed guide rails 54 and 56 along the workpiece support table 18 parallel to the saw slit 22. These guide rails 54 and 56 may advantageously form part of the table frame of the workpiece support table 18 or they may be part of a separate guide device which may be subsequently associated with the workpiece support table. Located above the boring and assembling device 50 between the workpiece support table 18 and the workpiece advancing device 12 is a slit-shaped recess 58 which extends parallel to the saw slit 22 and may be closed by a flap 60 in the event the boring and assembling device 50 is not required. This flap 60 may be flipped downwardly to open the slit-shaped recess 58.

Figure 3:
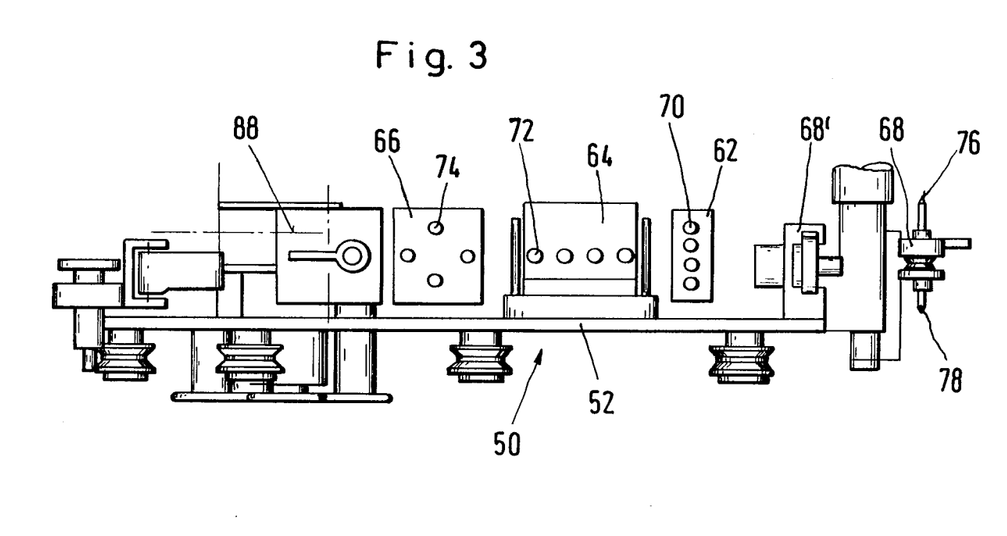
FIG. 3 a top view of the boring device of the apparatus.

Arranged on the carriage-type carrier 52 are, for example, boring heads 62, 64, 66, 68 with the boring heads 62 and 64 each comprising a row with, for example, four boring spindles 70 and 72, respectively, which are spatially associated with one another in accordance with a desired bore distribution. This is also applicable to the boring spindles 74 of the boring head 66.

The individual boring heads are arranged alongside one another, with the mutual association of the boring heads 62 and 64 being so designed that their rows of boring spindles 70, 72 extend in a horizontal plane perpendicularly to each other. Accordingly, the one boring spindle row extends perpendicularly and the other boring spindle row parallel to the saw slit 22. The boring heads 62, 64 and 66 serve to make flat face bores in the underside of panel-type workpieces or panel blanks, to which end the boring heads are suitably driven upwardly in a vertical direction relative to the carrier 52. This may, for example, be done pneumatically.

Figure 4:
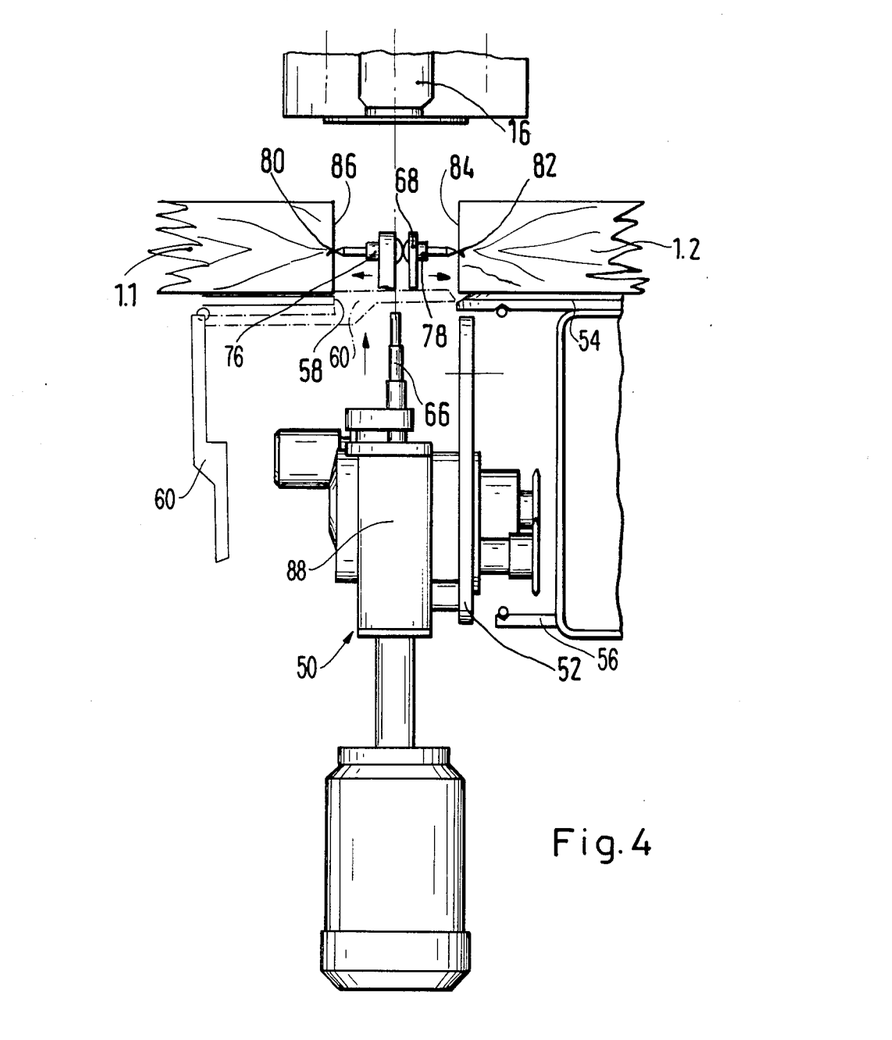
FIG. 4 a section taken along line 4—4 of FIG. 3 illustrating the boring unit for end face boring in the operating position.
Figure 5:
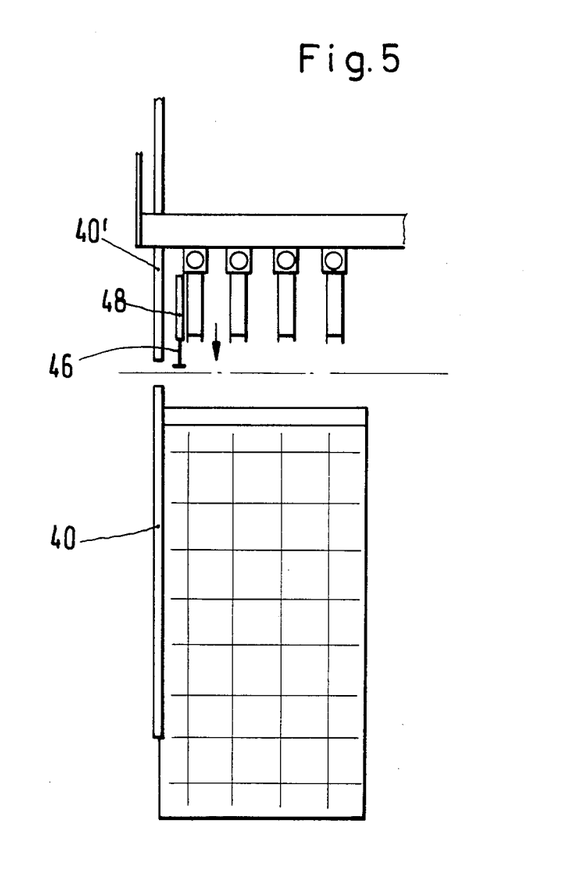
FIG. 5 a section of the top view of the apparatus according to FIG. 1, with the workpiece slide located in the area of its front end position and a stop device provided on the same in the stop position.

The boring head 68 serves to make bores in end face edges of workpieces. To this end, this boring head is provided with a column-type attachment 68' comprising in the area of its upper end two preferably coaxially arranged boring spindles 76 and 78 which are horizontally mounted and as shown in FIG. 4 are adjustable transversely to saw slit 22 in both directions, for successively drilling holes in end faces 84. Both boring spindles 76 and 78 are advantageously commonly or separately drivable in the same or opposite direction of rotation. The boring head 68 is arranged for example, for pneumatic adjustment, in a vertical direction, on the carrier 52 so that when not required it may submerge together with the other boring heads 62, 64, 66 and 68 in order to enable flap 60 to be swung upwardly to close slit-shaped recess 58. From FIG. 4 is it apparent that in the operating position of the boring head 68, the boring spindles 76 and 78 or drills 80, 82 inserted in these extend in the direction of workpiece end faces 84 and 86 facing each other.

The carrier is also provided with an assembling device 88 with the aid of which, for example, fittings may be automatically pressed into flat face bores. Several such assembling devices could, of course, also be provided. The carriage-type carrier 52 is displaceable and lockable by means of a transport device relatively to the panel blanks or panel-type workpieces to be provided with bores, which, in the same way as the workpiece slide 30 is displaced in a programmed manner in the direction of advance through steps of predetermined magnitude, may be effected in a program controlled manner to adjust device 50 along slit-shaped recess 58. Depending on which boring head or heads is or are required, the boring and assembling device 50 may be driven into one or several predetermined machining positions, whereupon the boring heads 62 to 68 and also the assembling device 88 are driven vertically upwardly into their operating position before their boring spindles and boring and assembling mechanisms start to work.

As FIG. 1 shows, the table frame guiding the boring and assembling device 50 and also the saw carriage 24 is so designed that in its non-operating position, the boring and assembling device 50 is advantageously located at the side of the workpiece advancing device 12, which enables actuation of the flap 60 to close the recess 58.

Figure 6:
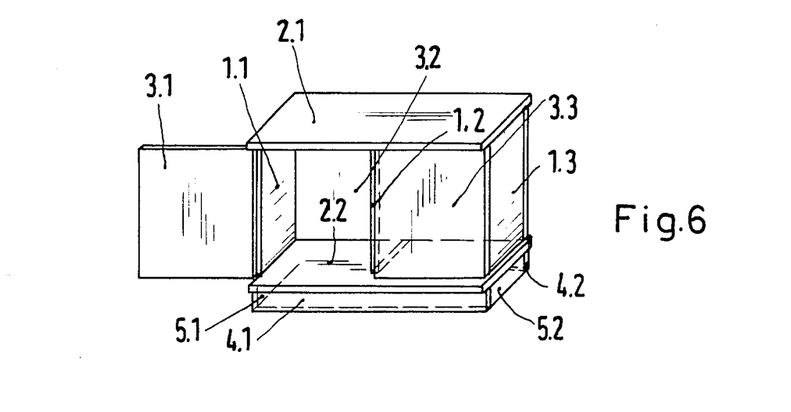
FIG. 6 a perspective view of a cupboard-type piece of furniture made from panel-type workpieces, as manufacturable in accordance with the inventive process and with the inventive apparatus.
Figure 7:
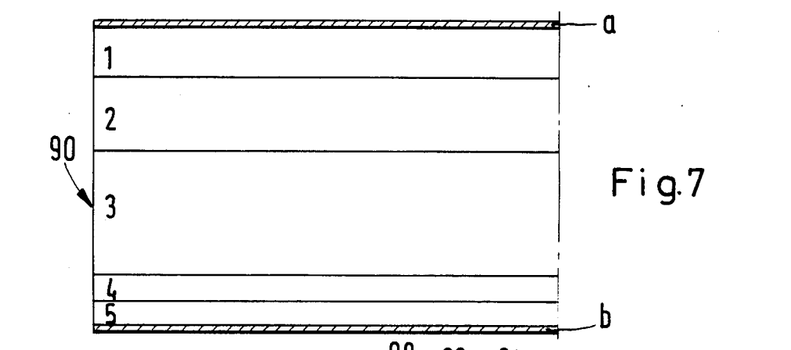
FIG. 7 a top view of a raw board for the manufacture of strip-shaped panel blanks on the panel splitting machine of the apparatus.
Figure 8:
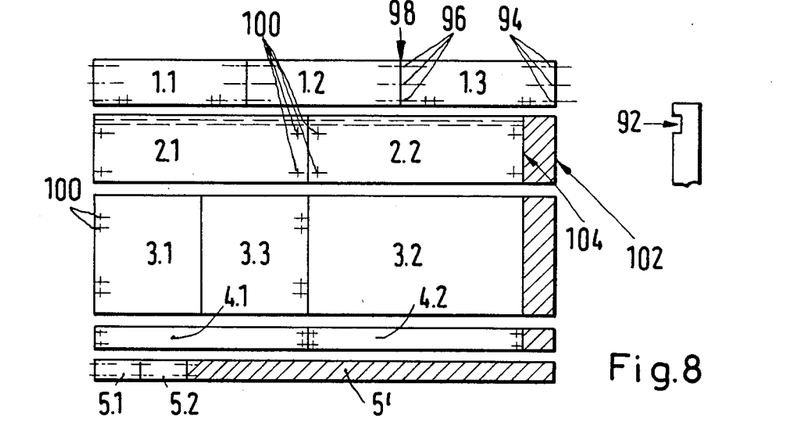
FIG. 8 a top view of the panel blanks made from the raw board, with the bores to be made in them indicated on the same.

The inventive process may be performed in the following manner with the aid of the described apparatus:

It is assumed that panel-type workpieces made to size and bored at the flat and end face sides for the manufacture of a cupboard-type piece of furniture in accordance with FIG. 6 are to be produced. This piece of furniture consists of a plurality of workpieces 1.1 to 5.2 which are to be made to size and correspondingly bored in one cycle on the apparatus. To this end, a raw board 90 of corresponding size is placed on the workpiece support table 18. This raw board 90 which may be a large-size particle board is, for example, split up into five strip-shaped panel blanks required for making the furniture, as shown in FIG. 8. This panel splitting may be effected automatically by a corresponding splitting program compiled externally by a computer being fed into a control computer of the panel splitting machine. The program transfer may be carried out on-line or by means of a data carrier, for example, a punched tape or by actuating the keys of the control manually.

After the raw particle board 90 has been placed on the table and made to abut the side stop 40, 40' with the aid of the transverse stop 44, the workpiece slide 30 is first driven in a program controlled manner towards the saw slit 22 of the panel splitting machine 10 and brought to a standstill at a predetermined distance from the same. The stops 46 of the stop devices 48 of the workpiece slide 30 are then extended and fix the end face of the raw board facing the chucks 34 at a predetermined distance from the saw slit 22. The raw board is then clamped with the aid of the press beam 16 and a first trimming cut a is made in order to thereby produce a workpiece stop edge which is exactly at right angles to the side stop 40, 40'. The workpiece is then released and pushed manually into the chucks 34 of the workpiece slide until it abuts the stop. Following a start pulse, the clamping in the chucks is carried out and the workpiece slide 30 is driven back into its initial position, taking with it the raw board, whereupon a further panel cut b is first made in order to produce a further trimmed edge opposite and exactly parallel to the trimmed edge which was first produced. The raw board is then split up into the panel blanks 1–5 shown in FIG. 8.

During execution of the longitudinal splitting cuts, it is possible with the aid of the saw carriage 24, in addition to the severing cuts, for one necessary longitudinal groove 92 to be simultaneously milled, for example, in each of the two panel blanks 1 and 2 so as to later enable positive engagement of, for example, the rear wall of the piece of furniture in these grooves.

The thus obtained strip-shaped panel blanks 1–5 are then turned individually by the machine attendant through 90°, positioned with their one longitudinal side against the side stop 40, 40' and first placed with the end face facing the workpiece slide 30 against the left stop 46 of the stop device 48, in accordance with FIG. 1, to which end the workpiece slide 30 is first driven towards the panel splitting machine into a ready position. If several panel blanks are required to be machined in a similar manner the same may be placed parallel to each other in the above-described position.

Following a start pulse, the panel blank is clamped by the press beam 16 and an end face trimming cut is made again with the aid of the saw carriage 24. In accordance with the computer program, this panel blank is now first provided either with bores at opposite end face edges or with such bores as are to be provided on its one flat side.

In accordance with FIG. 8, the panel blank 1 is solely to be provided with a number of end face bores 94 and 96. After execution of a first end face trimming cut, the boring and assembling device 50 is driven into its operating position in which the boring head 68 for the end face boring is then driven vertically upwardly into its operating position shown in FIG. 4. With the aid of the boring spindle 76, the three end face bores 94 are then made successively. To this end, after completion of the first bore, the carriage-type carrier 52 is driven parallel to the saw slit and transversely to the corresponding workpiece end face edge into a new boring position before the boring spindle 76 makes it advancing motion, to which end the boring unit 68 on the carrier 52 is correspondingly adjusted perpendicularly to the longitudinal direction of the saw slit 22.

Once the end face bores 94 have been made, the boring head 68 submerges to such an extent that the panel blank 1 with the bored end face may be manually inserted into the chucks 34 of the workpiece slide 30 and clamped there. The workpiece slide 30 is then driven back in a program controlled manner into a first entrainement position, through which the panel blank 1 is adjsuted in relation to the saw slit 22 in such a way that a severing cut 98 may then be made. Upon completion of this, the workpiece slide 30 is again driven in accordance with the control program through such a path in the direction of its rear initial position and fixed again that the end face edge 86 of the workpiece 1.3 made to size which was last produced is now in a position in which the end face bores 96 may be made with the aid of the boring spindle 78 of the boring unit 68 (see FIG. 4). This workpiece 1.3 is then removed from the machine and the remaining part of the panel blank 1 is machined in the above-described manner on the apparatus, i.e., in a program controlled manner, the one end face of the workpiece 1.2 to be subsequently produced is first bored, after which the panel blank is correspondingly displaced in a rearward direction, subsequently severed, and finally the remaining end face bores are made. Three panel-type workpieces 1.1–1.3 made to size and bored at the end faces are thus obtained. The narrow strip-shaped panel blank 5 is machined in the same manner, with the portion 5' of the panel blank 5 being left over as waste.

A further advantageous possibility of machining the panel blanks 1 and 5 consists in trimming the panel blank 1 at one end face, boring it at this end face, then inserting it into the chucks 34 and clamping it, and withdrawing the panel blank throughout its entire length and trimming it at its other end face. Upon completion of this trimming cut, the end face thus produced is bored, whereupon the panel blank 1 is adjusted to the third cutting position in order to sever the portion 1.3 from the remaining portion of the panel blank, i.e., execute the severing cut 98. The remaining portion 1.1, 1.2 is subsequently withdrawn in order to be positioned for the end face boring. The previously severed workpiece 1.3 is pushed manually along the stop 40, 40' against a previously actuated stop 46 and following a start pulse, the further sequence of operations is started, namely clamping and alternating or simultaneous end face boring. The finished workpiece 1.3 is then removed. The remaining portion 1.1 and 1.2 is adjusted to the next cutting position and the severing cut is then made. The above-described procedural and machining steps are subsequently repeated.

The following operating procedure is also possible:

Once the end face bores 94 have been made, the boring head 68 submerges to such an extent that the panel blank 1 with the bored end face may be manually inserted into the chucks 34 of the workpiece slide 30 and clamped there. The workpiece slide 30 subsequently withdraws the workpiece throughout its entire length, in a program controlled manner, so that it is then positioned for the trimming cut. After execution of the trimming cut, the workpiece is further withdrawn in a program controlled manner for the first end face boring position, clamped, bored at the end face, subsequently advanced in the opposite direction through a workpiece length, severed, and again withdrawn into the end face boring position. The severed workpiece portion is advanced against the withdrawn workpiece portion to the stop 45. Both workpieces are clamped at opposite end faces and the end face bores are made in both sides with the boring spindles 76 and 78. The front workpiece which is finished is removed and the workpiece located in the slide is advanced again through a workpiece length, positioned and severed. All of the further steps are repeated until the panel blank has been used up.

The remaining panel blanks 2-4 in the piece of furniture shown in FIG. 6 are to be provided with flat side bores 100 only. The procedure is as follows:

Following a start pulse, the workpiece slide 30 is driven into a front stop position, with the stop 46 being extended and the end face edge 102 abutting the same. The panel blank 2, for example, is then clamped. A trimming cut is made to produce an end face edge 104. The end face edge 104 thus produced is brought into an abutting position in the chucks 34, whereupon the panel blank is clamped in the same and displaced by the workpiece slide 30 by adjustment of the same in the direction of its rear initial position relative to the boring and assembling device 50 which has been driven into its machining position, and subsequently fixed so that in predetermined areas of the panel blank, the flat face bores 100 may then be made with the aid of the boring heads 62 and 64 or, if required, with the aid of the boring head 66 throughout the entire length of the panel blank. Once all of the flat side bores have been made in the one flat side of the panel blank 2, 3 or 4, the panel blank is displaced with the aid of the workpiece slide 30 in a clocked manner in the opposite direction into predetermined positions, fixed after each advance by the press beam 16 on the workpiece support table 18 and subsequently respectively severed. The single workpieces 2.1, 2.2; 3.1, 3.2 and 4.1, 4.2 are thereby obtained in made-to-size configuration with all of the flat face bores provided therein.

If workpieces are to be provided with both flat face bores and end face bores, all of the flat face bores may first be made in the panel blanks and then, as explained hereinabove, the provision of the end face bores 94, 96 and the splitting up of the panel blanks may be effected jointly.

It is evident that an apparatus which is not computer controlled is also suitable for performance of the process.

An apparatus according to claims 22 to 29 constitutes independent subject matter of the invention.

This apparatus enables advantageous performance of the inventive process when, for example, a panel splitting machine, for example, in the design of the panel splitting machine 10 is already available in a plant.

In this case, the workpiece support table of the panel splitting machine need only be provided with this apparatus at the side opposite its operating side and interconnected with the same.

The structural design of this apparatus may basically correspond to that provided by the workpiece advancing device 12 and the boring and assembling device 50 including its carrier 52 accommodating it. The carrier is guided in a horizontally adjustable and lockable manner beneath the workpiece support plane of the workpiece advancing device 12 on a special guide frame 110 transversely to its direction of advance. It is, however, advantageous to also provide this apparatus with a clamping device 112 mounted on the guide frame 110 (FIG. 2).

The apparatus claimed as independent subject matter of the invention therefore essentially comprises the parts of the apparatus shown in FIG. 2, located on the left side of a dot-and-dash vertical cutting plane a-a, and as defined in their essential parts in claims 22 to 29.

Figure 9:
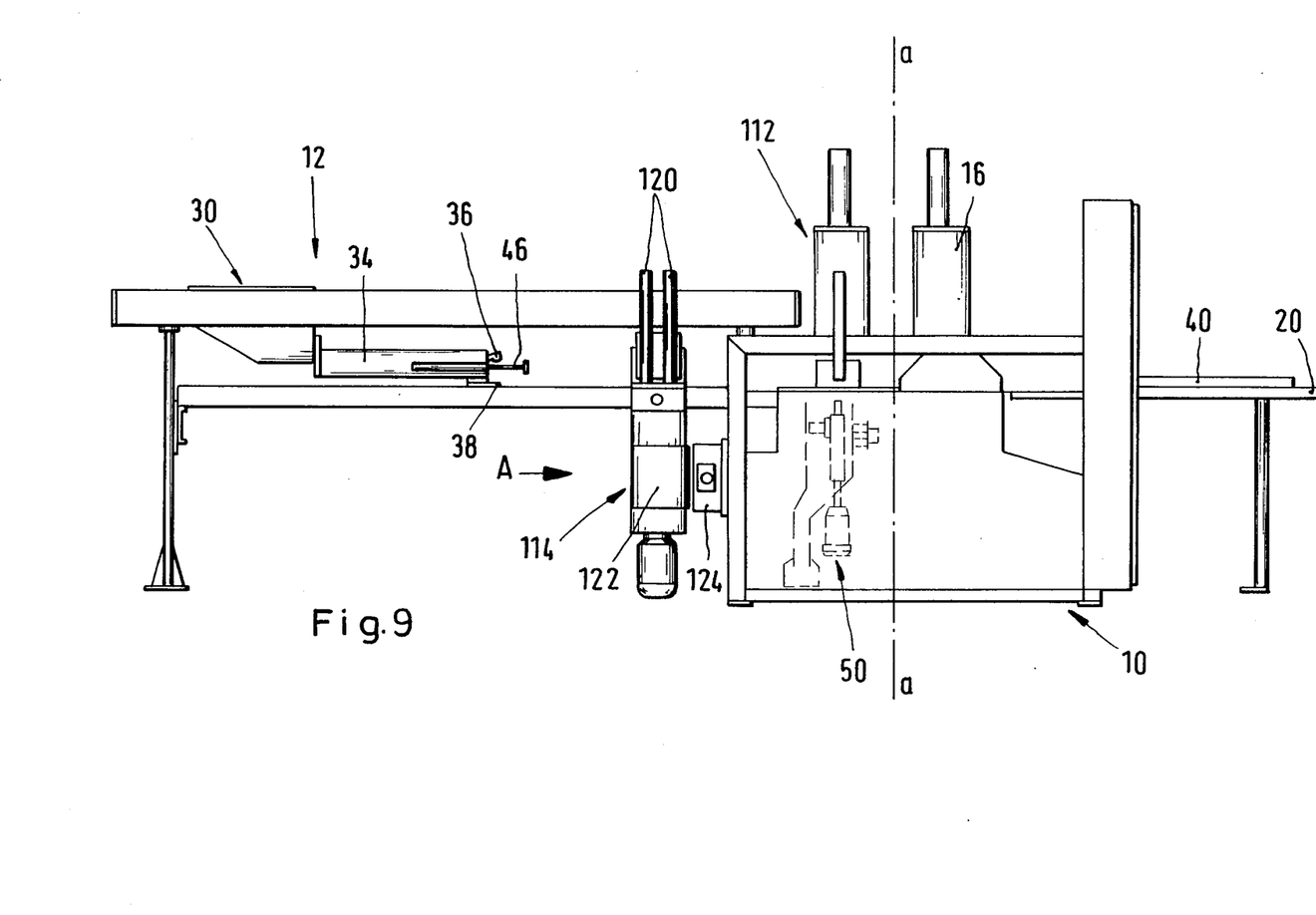
FIG. 9 an illustration similar to FIG. 2, with the apparatus being provided with an additional boring and assembling device.
Figure 10:
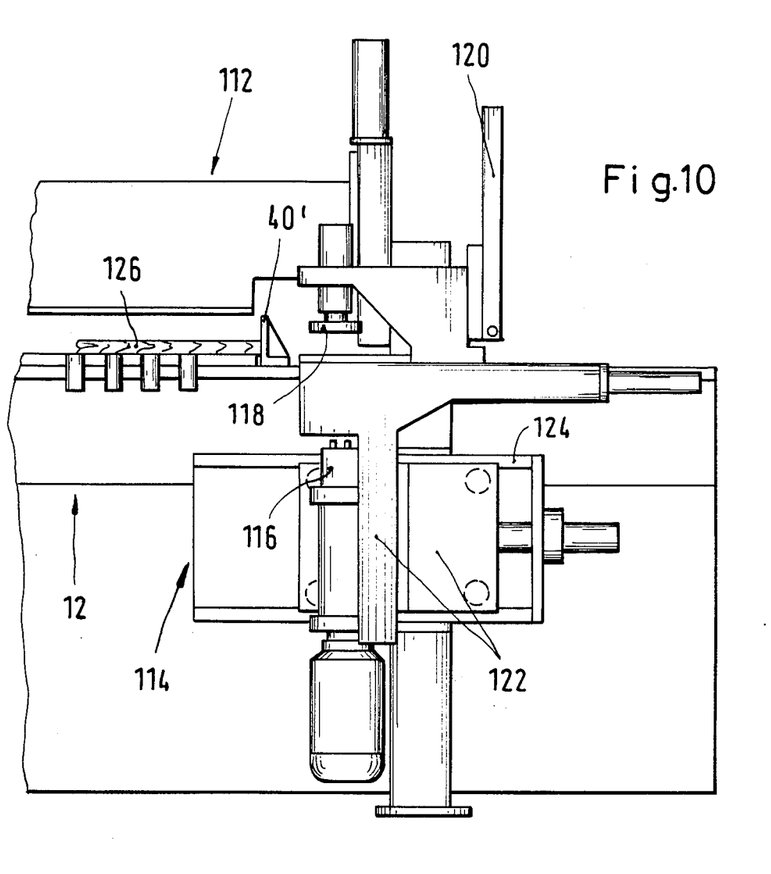
FIG. 10 a view of the boring and assembling device in the direction of arrow A of FIG. 9, in the initial position of the device.
Figure 11:
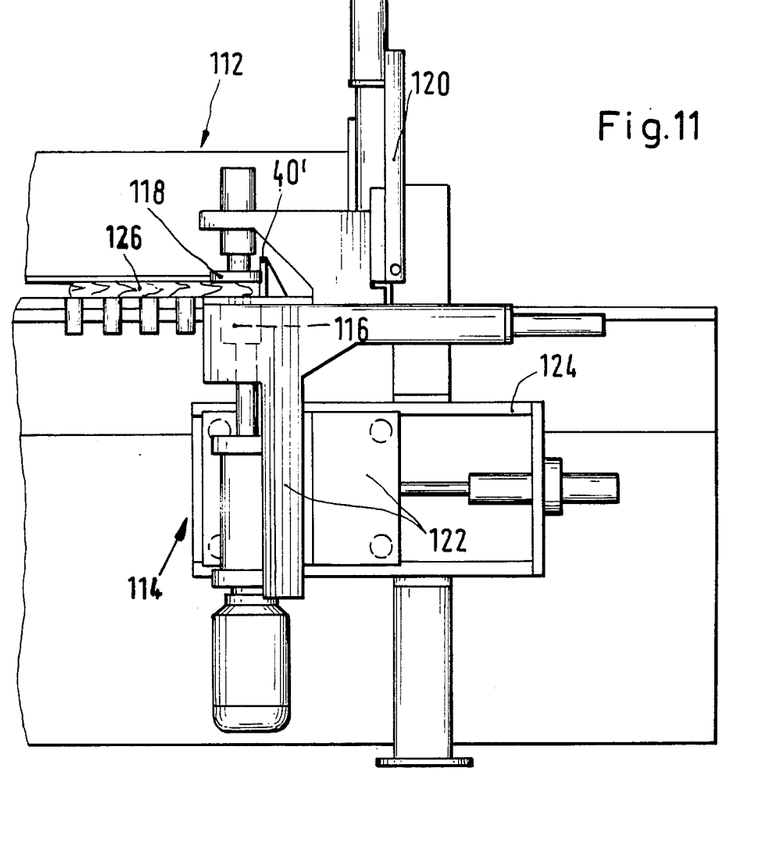
FIG. 11 an illustration similar to FIG. 10, with the device in the operating position.

FIGS. 9 to 11 show a modified embodiment of such an apparatus. It is characterized by a boring and assembling device 114 for fittings, for example, in the form of hinge fittings which, viewed in the direction of advance of the workpiece advancing device 12, is arranged in front of the boring device 50 and at the one longitudinal side of the workpiece advancing device 12.

It is provided with a vertically adjustable boring head 116 arranged beneath the workpiece support plane, with a workpiece clamping device 118 located above the boring head and with a magazining device 120 for the fittings to be assembled.

The devices 116, 118, 120 sit on a carriage 122 which is controllable along a stationary carriage guide 124 transversely to the direction of advance, horizontally from a position of rest in accordance with FIG. 10, into an operating position in accordance with FIG. 11.

After reaching the operating position in which the clamping device 118 engages the workpiece 126 resting on the workpiece advancing device 12, at one side edge, the same is actuated to fix the workpiece 126, whereupon the boring head 116 first travels upwardly and makes the corresponding assembly bores in the workpiece 126 from below. The boring head 116 then first travels down again, whereupon one of the stored fittings is transported by the magazining device 120 to beneath the assembly bores and pressed into the bores by the boring head 116 subsequently travelling up again. All of the devices 116, 118, 120 then return to their initial positions and the workpiece advance may be continued by the workpiece advancing device 12 for further workpiece machining.

Independently of whether the apparatus is provided with such an additional boring and assembling device 114, the device 50 may be designed solely for making bores or also be additionally provided with means for assembling fittings. It is evident that the boring and assembling device 114 may also be of another suitable design.

What is claimed is:

1. An apparatus for cutting panel-type workpieces and for making bores on the flat face and/or at the end faces thereof, having a frame comprising a workpiece receiving device equipped with a workpiece clamping device, a saw carriage displaceable along a straight guide relative to the workpiece receiving device and a boring device arranged in movable and settable manner on the frame, said apparatus comprising:
   said saw carriage being guided beneath a workpiece support table having a saw slit formed therein;
   a side stop extending substantially perpendicularly to said saw slit and being arranged on said workpiece support table proximate a first end of said saw slit;
   said workpiece advancing device being further provided with a programmable workpiece slide which is transversely and horizontally adjustable in relation to said saw slit to enable splitting up of said workpieces into a plurality of panel-type sections of desired dimensions;

said workpiece advancing device further being capable of carrying a workpiece in both directions of travel of said workpiece;

said workpiece advancing device further being fixable in predetermined positions relative to said saw slit;

said boring device comprising a programmed boring device being positioned especially beneath said workpiece support table so as to automatically provide a desired pre-selected configuration of bores into said flat face and/or end faces of said workpieces;

said boring device being variably adjustable and lockable along a line parallel to said saw slit and further being movable in a direction of advance;

said boring device comprising at least one vertical boring head for said flat face boring and an additional boring head for end face boring which is vertically adjustable and lockable; and said boring device being further provided with two oppositely arranged and oppositely movable boring spindles extending in a horizontal plane transversely to said saw slit.

2. The apparatus according to claim 1 wherein said boring spindle of said boring device is vertically movable in the direction of advance.

3. The apparatus according to claim 1, wherein said boring spindles are arranged parallel to each other, and extend in a horizontal plane transversely to said saw slit.

4. The apparatus according to claim 1, wherein said apparatus further includes at least one stop drivable from a released position to an operating position and against which a workpiece may be brought to rest with its edge facing said workpiece slide in a first trimming position.

5. The apparatus according to claim 1, wherein said apparatus further includes a further panel stop arranged between the saw slit and a first stop device.

6. The apparatus according to claim 1, wherein said apparatus further includes a transverse stop displaceable parallel to said saw slit.

7. The apparatus according to claim 1, wherein said saw carriage comprises at least two circular saw blades which are adjustable in laterally spaced relationship to each other and are extendable out of said saw slit to different heights.

8. The apparatus according to claim 2, wherein said boring device comprises at least two vertical boring heads, and wherein each of said vertical boring heads have at least one row of boring spindles, with the spindle row of a first of said vertical boring heads extending parallel to said saw slit and that of a second of said vertical boring heads extending transversely thereto.

9. The apparatus according to claim 1, wherein said boring device comprises a carriage-type carrier carrying said boring heads, said carrier being horizontally displaceable and lockable along a guide arranged parallel to said saw slit.

10. The apparatus according to claim 9, wherein said guide of said carriage-type carrier is formed by said frame of said workpiece support table.

11. The apparatus according to claim 9, wherein said carriage-type carrier includes at least one additional vertical boring head for producing a predetermined bore distribution and at least one boring and assembling device for automatically assembling fittings and the like.

12. The apparatus according to claim 9 wherein said carriage-type carrier together with said guide, are arranged beneath said workpiece support surface, and wherein above the plane of motion of said carrier there is provided between said workpiece support table and said workpiece advancing device, a slit-shaped recess which extends parallel to said saw slit and is closable by a closure flap which is swivelable in a downward direction into a released position; and in that a transverse stop is arranged above said workpiece support surface between said workpiece support table and said workpiece advancing device.

* * * * *

UNITED STATES PATENT AND TRADEMARK OFFICE
CERTIFICATE OF CORRECTION

PATENT NO. : 4,694,871
DATED : September 22, 1987
INVENTOR(S) : Erwin Jenkner

It is certified that error appears in the above-identified patent and that said Letters Patent is hereby corrected as shown below:

Col. 2, line 12   "progrmmable" should be instead -- programmable --

Col. 2, line 1    "the apparatus" should be instead -- an apparatus --

Col. 2, line 13   "sideview" should be instead -- side view --

Col. 4, line 33   "is it" should be instead -- it is --

Signed and Sealed this

Seventeenth Day of May, 1988

Attest:

DONALD J. QUIGG

Attesting Officer

Commissioner of Patents and Trademarks